UNITED STATES PATENT OFFICE.

SAMUEL PEACOCK, OF CHICAGO, ILLINOIS, ASSIGNOR TO THE SOUTHERN ELECTRO-CHEMICAL COMPANY, OF NEW YORK, N. Y., A CORPORATION OF NEW JERSEY.

PROCESS OF PRODUCING CALCIUM PHOSPHAMID.

1,047,440. Specification of Letters Patent. Patented Dec. 17, 1912.

No Drawing. Application filed July 12, 1910. Serial No. 571,614.

*To all whom it may concern:*

Be it known that I, SAMUEL PEACOCK, a citizen of the United States, residing at Chicago, in the county of Cook and State of Illinois, have invented certain new and useful Improvements in Processes of Producing Calcium Phosphamid; and I do hereby declare the following to be a full, clear, and exact description of the invention, such as will enable others skilled in the art to which it appertains to make and use the same.

This invention relates to a method of producing amids of phosphorus, and has for its object to manufacture products of this nature more cheaply and expeditiously than has been possible heretofore.

To these ends the invention consists in the novel steps and combinations of steps constituting my invention, more fully hereinafter disclosed and particularly pointed out in the claims.

I have discovered when calcium phosphid is heated between high temperatures, say above 800 C. and to less than 1400 C. in an atmosphere of nitrogen, that complex nitrogen compounds are formed the exact compositions of which at this time I am not able to determine. But the chemical reactions are of the nature of:—

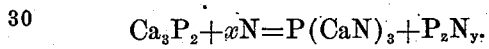

The exact chemical composition of the phosphorus nitrid product is also still in doubt, but the phosphorus calcium-amid is clearly present as a reaction product. As produced in the electric furnace, however, this amid is a substitution product, the hydrogen in that case being replaced by calcium according to the following equation:—

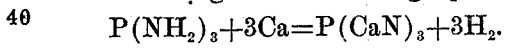

The phosphorus nitrid produced above is believed to be $P_3N_5$, for it forms an acid ammonium phosphate with water.

The reactions which actually take place in the furnace are invariably incomplete, and therefore they are very complex in nature which greatly interferes with exact determinations of the chemical character of the products. Commercially, however, the results obtained through the method so far disclosed are valuable because the nitrogen is chemically fixed and may be readily converted into the form of ammonia. The process, therefore, results in the production of a substance which when added to soil or to water, produces both phosphorus and nitrogen in a form very desirable as a plant food. In addition to this, this chemical combination of calcium, phosphorus and nitrogen is useful in many other processes involving the use of compounds of phosphorus or of nitrogen hydrids.

It is evident that those skilled in the art may vary the process without departing from the spirit of the invention, and therefore, I do not wish to be limited to details except as may be required by the claims.

What I claim is:

1. The process of producing an alkaline earth phosphamid which consists in subjecting an alkaline earth phosphid in an atmosphere of nitrogen to a temperature sufficient to cause the said constituents to react, substantially as described.

2. The process of producing calcium phosphamid which consists in subjecting a calcium phosphid in an atmosphere of nitrogen to a temperature sufficient to cause the said constituents to react, substantially as described.

3. The process of producing calcium phosphamids and nitrids of phosphorus which consists in exposing calcium phosphid to the action of nitrogen; heating said phosphid above 800° C., to bring about a reaction between said constituents; and in finally recovering the phosphamid and nitrid of phosphorus thus produced, substantially as described.

In testimony whereof I affix my signature, in presence of two witnesses.

SAMUEL PEACOCK.

Witnesses:
R. J. BOYLAN,
T. A. WITHERSPOON.